United States Patent
Reckling, Jr.

(10) Patent No.: US 11,672,262 B2
(45) Date of Patent: Jun. 13, 2023

(54) INFUSED ANTLER ANIMAL CHEW AND METHODS OF MANUFACTURE AND PACKAGING

(71) Applicant: James Sterling Reckling, Jr., Houston, TX (US)

(72) Inventor: James Sterling Reckling, Jr., Houston, TX (US)

(*) Notice: Subject to any disclaimer, the term of this patent is extended or adjusted under 35 U.S.C. 154(b) by 391 days.

(21) Appl. No.: 16/857,532

(22) Filed: Apr. 24, 2020

(65) Prior Publication Data

US 2021/0329945 A1    Oct. 28, 2021

(51) Int. Cl.

| A23K 10/26 | (2016.01) |
|---|---|
| A23K 40/30 | (2016.01) |
| A23K 10/24 | (2016.01) |
| A23K 10/30 | (2016.01) |
| A23K 20/105 | (2016.01) |
| A23B 4/10 | (2006.01) |
| A22C 17/00 | (2006.01) |
| A23B 4/005 | (2006.01) |
| A23K 50/40 | (2016.01) |

(52) U.S. Cl.
CPC ......... *A23K 10/26* (2016.05); *A22C 17/0093* (2013.01); *A23B 4/0056* (2013.01); *A23B 4/10* (2013.01); *A23K 10/24* (2016.05); *A23K 10/30* (2016.05); *A23K 20/105* (2016.05); *A23K 40/30* (2016.05); *A23K 50/40* (2016.05)

(58) Field of Classification Search
None
See application file for complete search history.

(56) References Cited

U.S. PATENT DOCUMENTS

| 6,165,474 A | 12/2000 | Frudakis |
| 10,538,373 B2 | 2/2020 | Whittle |
| 2004/0156883 A1 | 8/2004 | Brown |
| 2007/0113796 A1 | 5/2007 | Schildgen |
| 2016/0213027 A1* | 7/2016 | Maniatakos ........... A23K 20/20 |
| 2016/0316787 A1 | 11/2016 | Shrestha |
| 2020/0016112 A1 | 1/2020 | Fortin |

OTHER PUBLICATIONS

"Choosing the Right Chew for Your Dog" (https://www.allthebestpetcare.com/pet-nutrition/choose-right-dog-chew/—copyright 2019).*

* cited by examiner

*Primary Examiner* — Susan Hoffman
(74) *Attorney, Agent, or Firm* — Patent Clinic—South Texas College of Law

(57) ABSTRACT

Antler animal chew and methods of manufacturing and packaging the same are herein disclosed. The animal chew generally includes an antler section having a marrow core and a lipid composition infused within the marrow core.

9 Claims, 3 Drawing Sheets

INFUSED ANTLER ANIMAL CHEW AND METHODS OF MANUFACTURE AND PACKAGING

FIELD

Embodiments generally relate to antler animal chews and methods for manufacturing and packaging antler animal chews.

BACKGROUND

The pet industry is a multi-billion dollar enterprise which has been experiencing explosive growth in past years. According to the 2019-2020 National Pet Owners survey conducted by the American Pet Products Association, an organization involved in collecting and publishing comprehensive consumer research studies about pet ownership and pet products, 67% of U.S. households, or about 85 million families, own a pet. Most of this growth in pet ownership owes its origin to changes in culture. As Millennial and Generation Z consumers come into adulthood, they have embraced the pet-owning and pet-loving lifestyles to a far greater extent than their elders.

In response to this trend in the pet industry, businesses are beginning to grow their products and enhance their marketing. Pet industry innovators and investors are focusing on expanding pet food beyond what is traditional by opting for more fresh, frozen and made-to-order diets. They are expanding currently available treat options and are making premium pet foods and other products available at many more points of distribution than ever before. Additionally, many brands are moving to online distributors. In alignment with this growth, pet industry innovators and investors have also pushed for an increase of available animal chew options in the marketplace.

Animal chews are commonly given to domestic animals, such as dogs, to satisfy the animal's need to chew. Currently, there exists a variety of popular animal chew products available in the marketplace. These products include, but are not limited to, bones, rawhides, bullysticks, rubber chew toys, and hardened cheeses. Beyond bones and rawhides, another tough edible substance used to satisfy an animal, such as a dog, may include an antler.

However, animals often lose interest in such chews quickly, at least in part, due to the hard outer layer which can be too hard for an animal to bite through, thereby depriving an animal the benefit of the chew. In addition, such hard outer layers may cause an animal to damage its teeth. Furthermore, if the diameter of the chew is too small, the chew may splinter causing harm to the animal. To avoid such harmful effects, many animal chews are made from rubber and other such materials. A downside to using rubber and other similar materials is that these products are not digestible by animals.

Therefore, a need exists to increase the variety of animal chew products readily available to meet the needs and preferences of pet owners and their pets.

SUMMARY

An antler animal chew and methods for manufacturing and packaging an antler animal chew are provided in embodiments herein.

In one embodiment, generally, an animal chew is provided which includes an antler section having a marrow core and a lipid composition infused within the marrow core.

One or more embodiments include the animal chew of any preceding paragraph, wherein the antler section is selected from an ungulate order.

One or more embodiments include the animal chew of any preceding paragraph wherein the lipid composition includes at least one lipid and at least one cannabinoid. In some examples, the at least one lipid may be selected from animal oils, marine oils, fatty acid esters, fish oils, a fish oil in ethyl ester form, and combinations thereof. In some examples, the cannabinoid may include Cannabidiol (CBD). In some examples, the cannabinoid may include Cannabidivarin (CBDV). In some examples, the cannabinoid may include Cannabigerol (CBG).

One or more embodiments include the animal chew of any preceding paragraph, wherein the lipid composition includes the at least one lipid and at least one nutraceutical substance. In some examples, the nutraceutical substance may include glucosamine. In some examples, the nutraceutical substance may include chondroitin. In some examples, the nutraceutical substance may include echinacea. In some examples, the nutraceutical substance may include vitamins (i.e. Vitamin A, Vitamin B, Vitamin C, Vitamin E, etc.). In some examples, the nutraceutical substance may include minerals or chelated minerals.

One or more embodiments include the animal chew of any preceding paragraph, wherein the lipid composition further includes at least one flavoring.

One or more embodiments include the animal chew of any preceding paragraph, wherein a method for manufacturing an animal chew is provided which includes forming an antler section by mechanically splitting an antler crossways forming the antler section having a proximal end, a distal end, a length defined by a distance between the proximal end and the distal end, and a marrow core and applying a lipid composition to the proximal and/or distal end such that the lipid composition at least partially penetrates the marrow core.

One or more embodiments include the animal chew of any preceding paragraph, wherein the method of manufacturing further includes mechanically splitting lengthwise an antler section creating an exposed marrow core between the proximal end and the distal end and applying the lipid composition along the length of the exposed marrow core such that the lipid composition at least partially penetrates the exposed marrow core. The term "along the length of the exposed marrow core" is used to mean applying the lipid composition to at least a portion of the exposed marrow core and does not require that the lipid composition be applied continuously or uniformly along the length of the exposed marrow core.

One or more embodiments include the animal chew of any preceding paragraph, wherein a method for packaging an animal chew is provided which includes heat sealing an animal chew in a plastic covering and sealing the animal chew in the plastic covering in an outer bag.

One or more embodiments include the animal chew of any preceding paragraph, wherein the method of packaging further includes depositing an oxygen absorbing agent within the outer bag prior to sealing.

One or more embodiments include the animal chew of any preceding paragraph, wherein the method of packaging further includes depositing nitrogen within the outer bag prior to sealing.

One or more embodiments include the animal chew of any preceding paragraph, wherein the method of packaging further includes packaging excess lipid composition in the outer bag before sealing.

One or more embodiments include the animal chew of any preceding paragraph, wherein the outer bag may include mylar.

One or more embodiments include the animal chew of any preceding paragraph, wherein the outer bag is at least partially biodegradable.

One or more embodiments include the animal chew of any preceding paragraph, wherein the outer bag includes a mixture of compounds whose base is nopal cactus.

Some example methods of packaging the animal chew may include heat sealing the animal chew in a plastic covering and sealing the animal chew in the plastic covering in an outer layer. The outer layer may include a material that at least partially inhibits the ingress of light into the outer bag, e.g. mylar, or a material which is at least partially biodegradable. An oxygen absorbing agent or nitrogen may be deposited within the void formed by the outer layer prior to sealing.

BRIEF DESCRIPTION OF DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

The following description provides examples of antler animal chew products and methods of manufacturing, and is not limiting of the scope, applicability, or examples of elements discussed without departing from the scope of the disclosure. Various examples may omit, substitute, or add various procedures or components as appropriate. It should be understood that any aspect of the disclosure disclosed herein may be embodied by one or more elements of a claim. The word "Exemplary" is used herein to mean "serving as an example, instance, or illustration." any aspect as preferred or advantageous over other aspects.

In general, antler animal chews and methods of manufacturing and packaging such products are herein disclosed. The antler animal chew generally includes an antler section having a marrow core and a lipid composition infused within the marrow core.

Figure 3A:
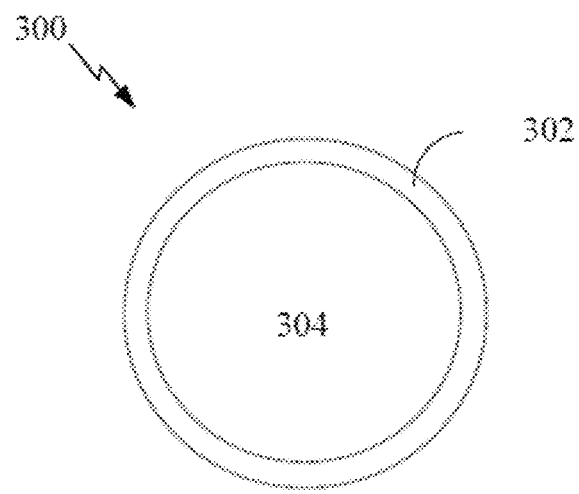
FIG. 3A illustrates a top-side view of an example antler animal chew split crossways forming an antler section having a proximal end, a distal end, a length defined by a distance between the proximal end and the distal end, and a marrow core.

FIG. 3A illustrates a top-side view of an example antler animal chew split crossways forming an antler section. FIG. 3A illustrates a top-side view of either the proximal end or distal end of the antler section having a proximal end, a distal end, a length defined by a distance between the proximal end and the distal end, and a marrow core. Antler animal chew 300 includes antler section sides 302 encompassing a marrow core 304 when the animal animal chew is split crossways. The antler section sides 302 is composed of a natural antler exterior and a natural antler interior. The natural antler interior is the portion of the antler section sides 302 which is adjacent to the marrow core 304.

Figure 3B:
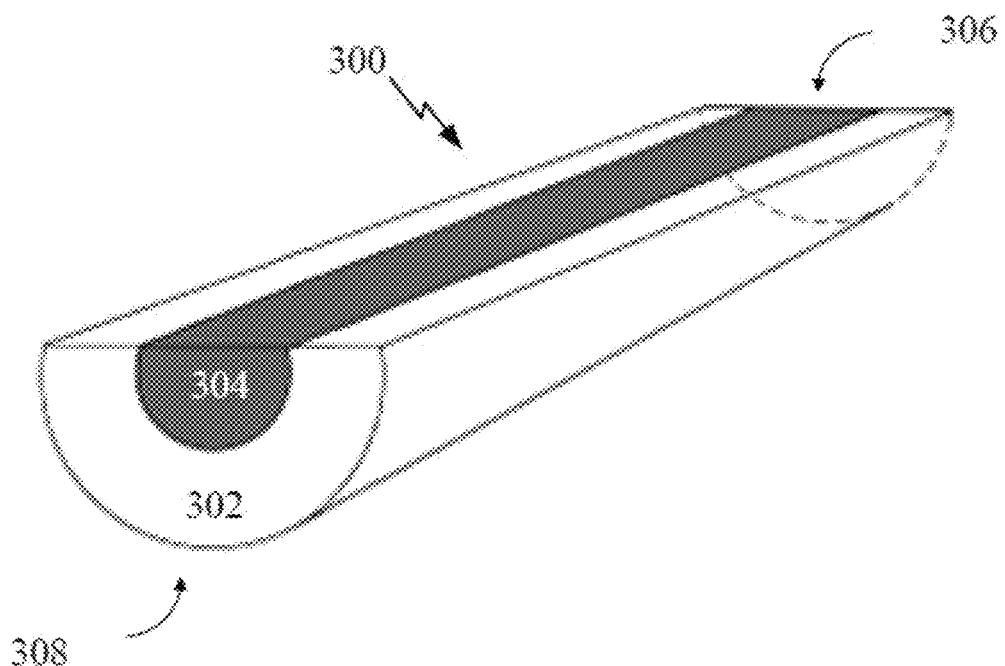
FIG. 3B illustrates another example antler animal chew split lengthwise forming an antler section having a proximal end, a distal end, a length defined by a distance between the proximal end and the distal end, and an exposed marrow core between the proximal and the distal end.

FIG. 3B illustrates another example antler animal chew split lengthwise. Antler animal chew 300 includes an antler section having a proximal end 308, a distal end 306, a length defined by a distance between the proximal end and the distal end, and an exposed marrow core 304 between the proximal and the distal end. In one or more embodiments, the antler animal chew 300 includes an antler section length defined by a distance between proximal 308 and distal ends 306 and antler section sides 302 extending between the proximal 308 and distal ends 306.

Antler is easily sourced from deer species, as deer antlers may naturally fall off. The animal sheds the antlers which may allow them to be collected without any disruption to the autonomy of or interference with the animal itself. Specifically, after a rut, decreasing testosterone levels cause an abscission layer to form between the antlers and their pedicels. As the connective tissue dissolves, the antlers become loose and fall off. The animal will then regenerate its antlers. In one or more embodiments, the antler section may be sourced from an animal selected from an ungulate order, including but not limited to deer, elk, reindeer, or otherwise. In a preferred embodiment, the antler is not sourced from whitetail deer due to the brittle composition of the antler structure—the whitetail antler easily fractures and may dislodge during chewing and cause internal harm to the pet. Further, the antler may be sourced within six months after the animal has shed the antler. The antler contains the most nutritional elements that attract the antler to pets as a chew.

Chew toys for animals perform several important functions. These toys may facilitate several health functions, including but not limited to teeth and gum cleaning, gum massaging, and exercise chewing. Benefits of these functions promote healthy teeth and jaw development. Additionally, it has been found that animal chews infused with lipid compositions can provide further health benefits to animals. For example, lipid compositions can provide therapeutic effects, such as controlling important cellular functions. In fact, many human diseases such as cancer, cardiovascular disease, neurodegenerative diseases, obesity, metabolic disorders, processes and inflammatory diseases, infectious diseases or autoimmune diseases, among others, have been associated with alterations in the levels or the composition of lipids in biological membranes, further demonstrating the beneficial effects that treatments with lipid compositions could be used to reverse these diseases.

In one or more embodiments, the antler section generally includes a marrow core to which the lipid composition is applied. In one or more embodiments, the marrow core is exposed such that the lipid composition is applied thereto and allows easier accessibility to the marrow for the animal to chew.

Lipid compositions have other functions of great importance in the maintenance of health, onset of disease, and healing. When the body is sick, cells are sick, and any given alteration in the lipid membrane produces alterations in cells which can lead to the occurrence of diseases. Similarly, therapeutic, nutraceutical or cosmetic interventions, aimed at the regulation of the levels of membrane lipids can prevent and reverse (cure) pathological processes.

In one or more embodiments, the lipid compositions include a lipid, such as an animal oil, a marine oil, coconut oil, fatty acid esters, fish oil, fish oil in ethyl ester form or combinations thereof. The lipid composition may be present in a range from 2 wt. % to 98 wt. % of the animal chew.

It has been found that Cannabinoid compounds can boost a pet's overall health. One such cannabinoid, Cannabidiol (CBD), has been used to treat diseases caused by stress and has displayed sedative effects in animal tests. Another cannabinoid, Cannabidivarin (CBDV), has been found to reduce the number and severity of seizures in animal models. Another cannabinoid, Cannabigerol (CBG), has also been shown to reduce depression in animal models. CBD has been shown to be effective following oral administration in lipid-based formulations in animal models of a number of debilitating diseases caused by over-reactive immune responses (autoimmune and inflammatory diseases) including multiple sclerosis (MS), rheumatoid arthritis, diabetes mellitus, allergic asthma, autoimmune hepatitis, and colitis. Similarly, THC has been shown to be beneficial following oral administration in lipid-based formulations or parenteral injections in MS, diabetes mellitus, and allergic asthma animal models.

Cannabinoids are lipophilic, making lipid compositions ideal vehicles for drug transport throughout a biological system. Thus, the lipid compositions may contain a cannabinoid, such as, Cannabidiol (CBD), Cannabigerol (CBDV), Cannabidivarin (CBG), or combinations thereof, for example. Although the exact medical implications are currently being investigated, Cannabidiol (CBD) has shown promise as a therapeutic and pharmaceutical drug target. In particular, Cannabidiol (CBD) has shown promise as an analgesic, anticonvulsant, muscle relaxant, anxiotytic, antipsychotic and has shown neuroprotective, anti-inflammatory, and antioxidant activity. Oral administration of cannabis with lipids leads to high levels of cannabinoids in the intestinal lymphatic system and prominent immunomodulation, which, in turn, increases systemic exposure to Cannabidiol (CBD) and thus the therapeutic effects are magnified.

The lipid composition may contain a cannabinoid in a range from 0 wt. % to 72 wt. %, based on the total concentration of lipid composition.

Nutraceutical substances are currently available in the veterinary market place for use in the treatment or management of acute or chronic conditions in animals. For example, nutraceutical substances are used to manage canine afflictions such as atopic dermatitis, dermatitis secondary to flea allergies and degenerative joint disease or osteoarthritis. Examples of nutraceutical substances for the management of osteoarthritis are available in capsules, chewable tablets, and soft chewable forms and contain nutraceutical agents that manage the various conditions associated with degenerative joint disease. It is sometimes difficult to give an uncooperative animal capsules without some extraordinary procedures. One or more embodiments include applying at least one nutraceutical substance to the marrow core. The nutraceutical substance can be applied to the marrow core separate from the lipid composition or the lipid composition may include the nutraceutical substance.

The nutraceutical substance may be present in an amount ranging from 0 wt. % to 20 wt. % of the animal chew.

In one or more embodiments, the nutraceutical substance may include herbal remedies, vitamins, minerals, antioxidants, and any combination thereof. Examples of herbal remedies may include glucosamine, chondroitin, echinacea, St. John's wort, ginseng, green tea, ginger, aloe vera, *Ginkgo biloba*, and whey protein. Examples of vitamins may include Vitamin A, Vitamin B, Vitamin C, Vitamin E. Examples of minerals may include minerals or chelated minerals. Examples of antioxidants may include soybean oil, Vitamin E, and citric acid.

One or more embodiments include applying a flavoring to the marrow core. The flavoring can be applied to the marrow core separate from the lipid composition or the lipid composition may include the flavoring.

The flavoring may be applied in an effective amount. An effective amount is an amount that tends to make the animal chew more desirable to the animal.

Examples of the flavoring may include beef, chicken, ground pig hide, fishmeal, garlic, liver, onion powder, and other animal- or plant-based additives.

Aspects of the present disclosure provide methods of manufacturing an animal chew and methods of packaging an animal chew.

Historically, cannabinoid lipid formulations have been packaged in amber-colored vials in order to prevent photochemical degradation of the cannabinoids. However, packaging the antler animal chew in an amber-colored vial large enough to hold the antler animal chew is not an economically viable option.

Figure 1:
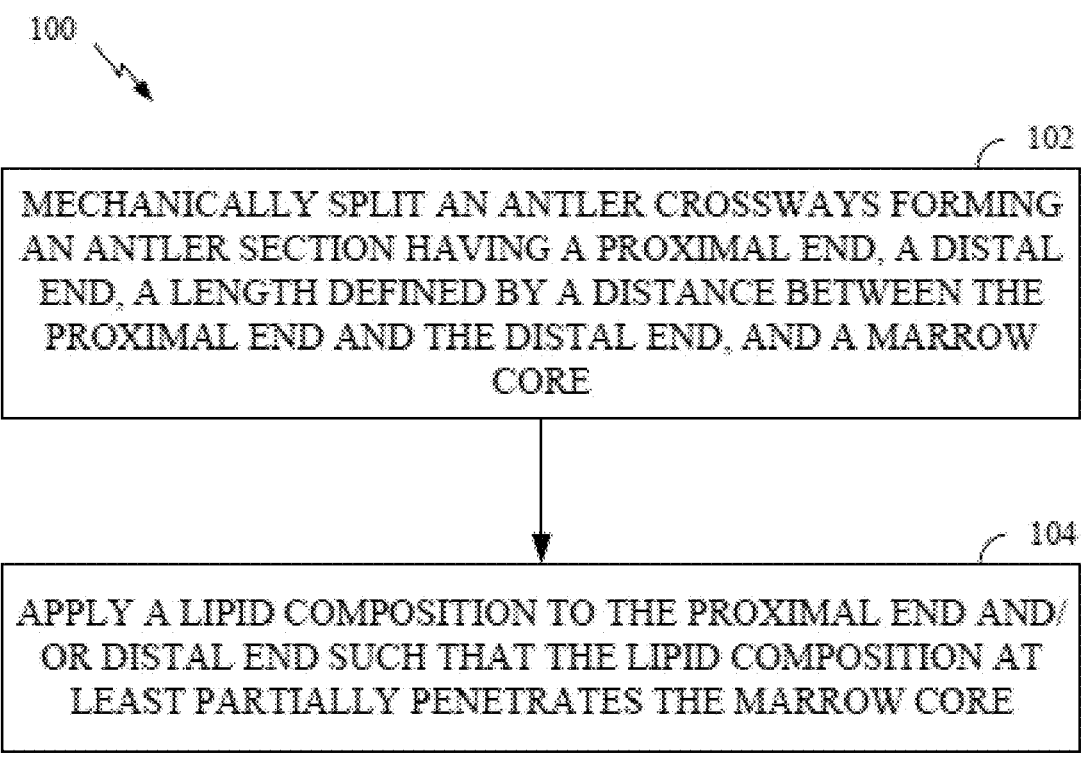
FIG. 1 illustrates a flow diagram illustrating example operations for manufacturing an animal chew, in accordance with certain aspects of the present disclosure.

FIG. 1 is a flow diagram illustrating example operations 100 for manufacturing an animal chew.

The operations 100 include forming an antler section.

The operations 100 may begin at 102, by mechanically splitting an antler crossways forming the antler section having a proximal end, a distal end, a length defined by a distance between the proximal end and the distal end, and a marrow core.

At 104, operations further include applying a lipid composition to the proximal and/or distal end such that the lipid composition at least partially penetrates the marrow core.

The operations at 100 may further include mechanically splitting the antler section lengthwise creating an exposed marrow core between the proximal end and the distal end. Further, the lipid composition is applied along the length of the marrow core such that the lipid composition at least partially penetrates the exposed marrow core.

Figure 2:
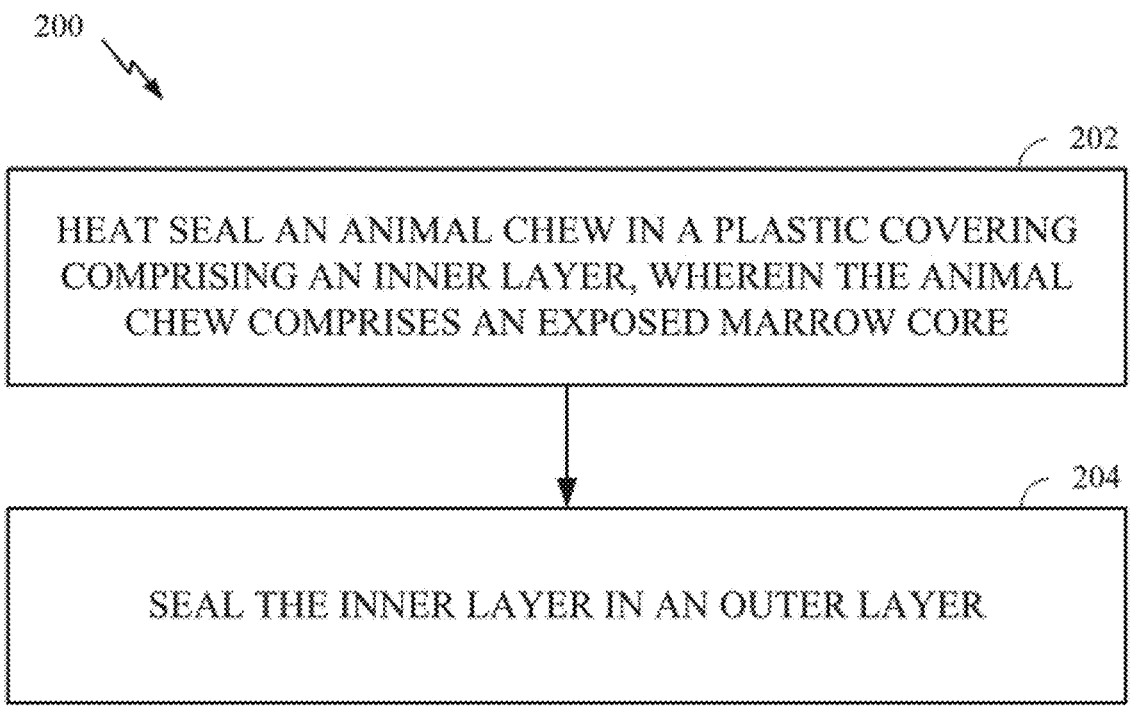
FIG. 2 illustrates a flow diagram illustrating example operations for packaging an animal chew, in accordance with certain aspects of the present disclosure.

FIG. 2 is a flow diagram illustrating example operations 200 for packaging an animal chew.

The operations 200 may begin at 202, by heat sealing an animal chew in a plastic covering.

At 204, operations further include sealing the animal chew in the plastic covering in an outer layer. In some examples, the outer layer includes mylar. In some examples, the outer layer is at least partially biodegradable. In some examples, the outer layer includes a mixture of compounds whose base is nopal cactus.

The operations at 200 may further include depositing an oxygen absorbing agent within the void formed by the outer layer prior to sealing. In some examples, the oxygen absorbing agent includes an oxygen scavenger substance which reacts with oxygen chemically or enzymatically to reduce the oxygen present in the void formed by the outer layer. The oxygen absorbing agent reduces deterioration of the lipid composition by minimizing the interaction of oxygen with the lipid composition. The oxygen absorbing agent is often packaged in a sachet highly permeable to oxygen.

The operations at 200 may further include depositing nitrogen within the void formed by the outer layer prior to sealing.

The operations at 200 may further include packaging excess lipid composition within the void formed by the outer layer prior to sealing.

Light has been found to break down the beneficial effects of cannabinoids. In particular, UV light in the blue spectrum of 200-500 nm is typically the most damaging to cannabinoids. Thus, the use of a material that at least partially inhibits the ingress of light through the outer layer, e.g. mylar, for the outer layer is an example of a method to slow photodegradation of the cannabinoids.

The outer layer may include an at least partially biodegradable material, e.g. a mixture of compounds whose base is nopal cactus. Nopal cactus has certain chemical characteristics which make it a naturally viscous polymer. This polymer, when combined with other compounds, creates a non-toxic, biodegradable, edible plastic with a similar appearance and properties to some petroleum-derived plastics.

Oxidation has been found to break down the beneficial effects of cannabinoids. Replacing at least some of the oxygen within the void formed by the outer layer prior to sealing with nitrogen is an example of a method to slow the degradation of the cannabinoids. Placing an oxygen absorbing agent within the void formed by the outer layer prior to sealing is another example of a method to slow the degradation of the cannabinoids.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations While the foregoing is directed to embodiments of the present invention, other and further embodiments of the invention may be devised without departing from the basic scope thereof and the scope thereof is determined by the claims that follow.

Definitions

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

As used herein, "CANNABIDIOL," refers to non-psychotropic cannabis constituent and may or may not contain less than about zero point three (0.3) percent % THC.

As used herein, the term "CANNABIDIVARIN" refers to a non-psychoactive cannabinoid found in Cannabis. It is a homolog of cannabidiol (CBD), with the side-chain shortened by two methylene bridges (CH2).

As used herein, the term "CANNABIGEROL" refers to a non-psychoactive cannabinoid found in Cannabis. It is a homolog of cannabidiol (CBD), with the side-chain shortened by two methyl (CH3) groups.

As used herein, the term "CANNABINOIDS" refers to a group of chemical compounds that act upon the cannabinoid receptors in cells that are primarily in the brain which may include cannabidiol, cannabigerol, and cannabidivarin being the psychoactive compound of cannabis or in the form of a synthetic cannabinoid. Three of the cannabinoids defined here are CBD, CBG, and CBDV. Thus, cannabinoids are the genus and CBI), CBG, and CBDV are some of the species of the genus of the cannabinoids.

As used herein, the term "COMPOSITION" refers to a lipid composition that preferably includes an amount of cannabinoid by weight and the other components by weight as previously stated for the coconut oil, animal oil, marine oil, and fish oil.

As used herein, the term "NUTRACEUTICAL" refers to vitamins, minerals, antioxidants, and other herbal remedies, generally exempted from the premarket approval process of the FDA. Herbal remedies may include glucosamine, chondroitin, echinacea, and St. John's wort.

As used herein, the term "FLAVORING" refers to beef, chicken, ground pig hide, fishmeal, garlic, liver, onion powder, and other animal- or plant-based additives.

As used herein, the term "TETRAHYDROCANNABINOL", otherwise known as "THC", refers to the active principle of Cannabis, occurring in two isomeric forms, both considered psychomimetically active. THC is often the primary intoxicant found in marijuana and hashish.

What is claimed is:

1. An animal chew, comprising:
    an antler cross-section having an original marrow core, wherein the original marrow core is exposed;
    a lipid composition, wherein the lipid composition is applied uniformly along the original marrow core and penetrates the original marrow core;
    at least one cannabinoid infused with the original marrow core, wherein the at least one cannabinoid substance is applied separately to the original marrow core and penetrates the original marrow core;
    at least one nutraceutical substance, wherein the at least one nutraceutical substance is applied separately to the original marrow core and penetrates the original marrow core; and
    at least one flavoring infused with the original marrow core, wherein the at least one flavoring is applied separately to the original marrow core penetrates the original marrow core.

2. The animal chew of claim 1, wherein the antler cross-section is sourced from an animal selected from an ungulate order.

3. The animal chew of claim 1, wherein the at least one nutraceutical substance includes at least one of an glucosamine, chondroitin, vitamins, and minerals.

4. The animal chew of claim 1, wherein the at least one flavoring includes at least one of a beef, garlic, liver, onion powder additive.

5. The animal chew of claim 1, wherein the lipid composition is selected from animal oils, marine oils, coconut oils, fatty acid esters, fish oils, a fish oil in ethyl ester form, and combinations thereof.

6. The animal chew of claim 1, wherein the at least one cannabinoid comprises Cannabidiol (CBD), Cannabidivarin (CBDV), Cannabigerol (CBG), or any combination thereof.

7. The animal chew of claim 2, wherein the ungulate order includes at least one of an elk, deer, and reindeer.

8. The animal chew of claim 1, wherein the at least one flavoring is plant-based.

9. The animal chew of claim 1, wherein the at least one flavoring is animal-based.

* * * * *